United States Patent [19]

Watanabe et al.

[11] 4,222,289
[45] Sep. 16, 1980

[54] AUTOMATIC TRANSMISSION WITH OVERDRIVE

[75] Inventors: Kazuaki Watanabe; Kouziro Kuramochi; Yukio Terakura, all of Toyota, Japan

[73] Assignee: Toyota Jidosha Kogyo Kabushiki Kaisha, Aichiken, Japan

[21] Appl. No.: 863,406

[22] Filed: Dec. 22, 1977

[30] Foreign Application Priority Data

Apr. 27, 1977 [JP] Japan .................................. 52-47875

[51] Int. Cl.³ ....................... F16H 37/00; F16H 57/02
[52] U.S. Cl. .................................. 74/740; 74/781 R; 74/606 R
[58] Field of Search .................. 74/740, 781 R, 606 R

[56] References Cited

U.S. PATENT DOCUMENTS

| | | | |
|---|---|---|---|
| 3,053,115 | 9/1962 | Cartwright et al. | 74/606 R |
| 3,082,645 | 3/1963 | Chiarello | 74/606 R |
| 3,424,034 | 1/1969 | Wickman | 74/781 R |
| 3,444,761 | 5/1969 | Wickman | 74/781 R X |
| 3,533,307 | 10/1970 | Gunderson | 74/740 |
| 3,797,332 | 3/1974 | Cameron et al. | 74/781 R X |
| 3,942,502 | 3/1976 | Gorres et al. | 74/606 R X |
| 4,036,081 | 7/1977 | Onuma et al. | 74/781 R |
| 4,043,223 | 8/1977 | Ohnuma | 74/740 |
| 4,098,134 | 7/1978 | Kubo et al. | 74/740 X |
| 4,152,957 | 5/1979 | Watanabe et al. | 74/781 R |

FOREIGN PATENT DOCUMENTS

908,911  10/1962  United Kingdom ...... 74/740

*Primary Examiner*—Leslie Braun
*Attorney, Agent, or Firm*—Toren, McGeady and Stanger

[57] ABSTRACT

An automatic transmission with overdrive in which a torque converter, an overdrive gear mechanism and an underdrive gear mechanism are separately segmented and are assembled or fastened together by simple devices, such as bolts. To enable this, the dimensions of these components which are associated with coupling portions thereof, such as inner and outer diameters, are designed for standarization. Accordingly, a torque converter and an underdrive gear mechanism of conventional type may be used requiring little or no modification. Additonally, the components are advantageously arranged with the overdrive gear mechanism positioned between the torque converter and the underdrive gear mechanism. The input shaft of the overdrive gear mechanism is splined to the output end of a shaft for the turbine vanes, and is positioned in axial alignment with the input shaft of the underdrive gear mechanism as well as with the shaft for the turbine vanes.

1 Claim, 3 Drawing Figures

AUTOMATIC TRANSMISSION WITH OVERDRIVE

BACKGROUND OF THE INVENTION (1) Field of the Invention

This invention relates to an automatic transmission for use in an automotive vehicle, and more particularly to an automatic transmission having an overdrive gear mechanism positioned between a hydrokinetic torque converter and an underdrive.

(2) Description of the Prior Art

As is well known, an automatic transmission for automotive vehicles operates to automatically change gear reduction ratios in response to vehicle speed and load on the vehicle engine. An automatic transmission in general consists of a torque converter and an underdrive gear mechanism which is coupled to the converter and establishes two or more gear reduction ratios of no less than 1. Recently, a demand has arisen for an automatic transmission with overdrive in order to improve engine efficiency and emission control of the engine.

It has been common practice, when an overdrive gear mechanism is to be added to an automatic transmisson, to position the overdrive gear mechanism on the output side of the automatic transmission. This is to enable ease of design change in the automatic transmission itself.

However, in a situation where an overdrive gear mechanism is built into the transmission itself in the rear part thereof, torque from the engine is increased by the underdrive gear mechanism and is transmitted to the overdrive gear mechanism. Thus, the strength of the gears provided must be substantially increased, and an excessive increase in the amount of anti-friction materials provided is also required.

Accordingly problems arise with regard to durability and cost, with an accompanying increase in the size of the transmission. In addition, when the automatic transmission thus arranged is installed on a vehicle, considerable design changes are required for the vehicle body.

It is accordingly an aim of the present invention to provide an automatic transmission with overdrive, which avoids the aforementioned shortcomings by positioning the overdrive gear mechanism between a hydrokinetic torque converter and an underdrive gear mechanism of the assembly i.e., on the input side of the underdrive gear mechanism.

The invention is intended to provide an automatic transmission which require little or no design change not only on the side of the vehicle body but also on the side of a conventional type automatic transmission itself.

Furthermore, the invention is directed to an automatic transmission with overdrive, which is compact in size and well accommodated to mass production.

More specifically, the invention is directed towards an automatic transmission with overdrive, which includes a torque converter segment, an overdrive segment and an underdrive segment, which are provided separately of each other and which may be assembled or fastened together with only simple fastening means, thereby allowing desired interchangeability and simple assembly.

The invention is intended to enable utilization of conventional components, such as planetary gears, one-way clutches, and frictional engaging means, of the type normally in use in an overdrive gear mechanism, thereby establishing standerization of parts.

SUMMARY OF THE INVENTION

According to the present invention, a conventional type automatic transmission providing a gear change ratio of 1 for the highest speed drive, and produced in a production line, is used intact, thereby eliminating a need to change the designs of the hydrokinetic torque converter, oil pump, overdrive gear mechanism, underdrive gear mechanism, and hydraulic control system.

More specifically, there are separately provided a torque converter segment, an overdrive segment and an underdrive segment for an automatic transmission, with the overdrive segment interposed between the torque converter segment and the underdrive segment. The torque converter housing, the transmission case for the underdrive gear converter housing, the transmission case for the underdrive gear mechanism, and the overdrive case are thus provided separately, and then assembled or fastened together by simple fastening means. In this respect, an input shaft of the overdrive gear mechanism is splined to an output end of a turbine shaft in the torque converter, rather than coupled thereto integrally, while an output shaft of the overdrive gear mechanism is splined to an input shaft of the underdrive gear mechanism, rather than coupled thereto integrally.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE EMBODIMENTS

Figure 1:
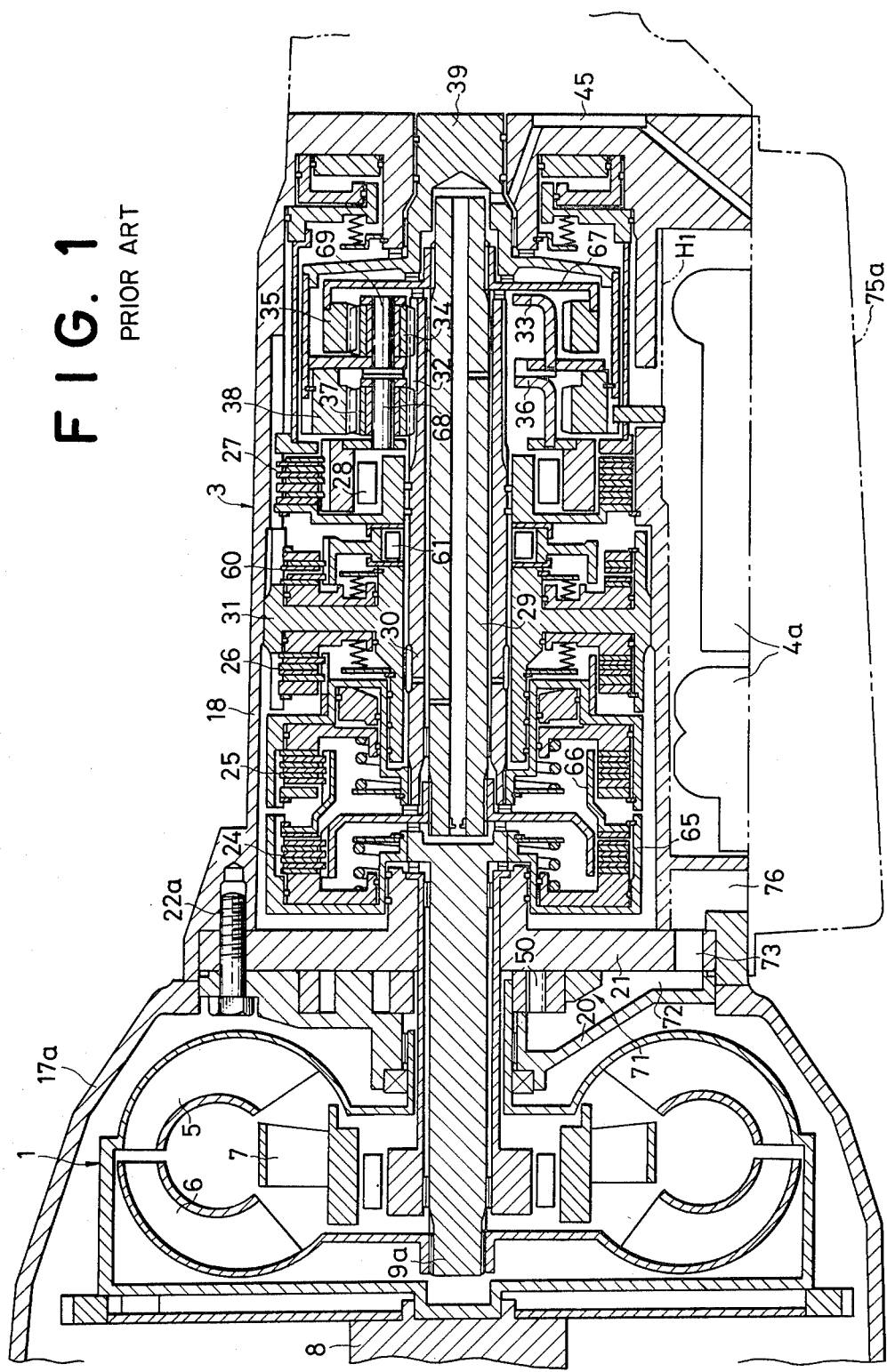
FIG. 1 is a longitudinal cross-sectional view of an automatic transmission which is devoid of an overdrive gear mechanism, and of the type which has been produced in a production line.

FIG. 1 is a longitudinal cross-sectional view of an automatic transmission of the type, which is used in an automobile available in the market. A hydrokinetic torque converter 1 includes a pump impeller 5, turbine vanes 6 and stator vanes 7. The pump impeller 5 is coupled to a crank shaft 8 of an engine (not shown) while the turbine vanes 6 are coupled to a turbine shaft 9a. The torque converter 1 is enclosed with a housing 17a. The rear side of torque converter 11 is closed with an oil pump body 20. In this respect, it should be noted that the side closer to the engine is referred to as the front side, and the side away from the engine is referred to as the rear side.

An oil pump cover 21 is located adjacent the oil pump body 20 and, in cooperation with the oil pump body 20, defines a pump chamber for accommodating an oil pump 71 therein. An oil pump gear 50 in the oil pump 71 is coupled to the pump impellers 5. A passage 72 defined in the oil pump body 20 is connected to an inlet port for the oil pump 71 as well as to a passage 73 defined in a lower portion of the oil pump cover 21.

Positioned in the rear of the oil pump 71 but adjacent to the oil pump cover 21 in coaxial relation to the torque converter 1 is an underdrive gear mechanism 3 for three-forward-speed and one-reverse-speed drive. The turbine shaft 9a serves as an input shaft of the underdrive gear mechanism 3. A front portion of the underdrive gear mechanism 3 is encompassed with the oil pump cover 21 and transmission case 18. The oil pump body 20, oil pump cover 21 and transmission case 18 are fastened together by means of two or more bolts 22a.

The turbine shaft 9a is coupled to a clutch cylinder 65, while a multiple disc clutch 24 is interposed between the clutch cylinder 65 and an intermediate shaft 29.

A hub 66 is fitted in the clutch cylinder 65, while a multiple disc clutch 25 is disposed between the hub 66 and a sun gear shaft 30. Positioned between the sun gear shaft 30 and a support 31 secured to the transmission case 18 is a multiple disc brake 26, and a series connection of a one-way clutch 61 and a multiple disc brake 60. The sun gear shaft 30 is formed with a sun gear 32. The sun gear 32 meshes with planetary pinions 34 and 37, while one of planetary pinions 37 meshes with a ring gear 35, and the other of planetary pinion 34 meshes with a ring gear 38. In other words, there are provided two-row planetary gear units consisting of a combination of sun gear 32, planetary pinion 34 and ring gear 35 and another combination of sun gear 32, planetary pinion 37 and a ring gear 38. The ring gear 35 is coupled through the medium of a flange 67 to the intermediate shaft 29. The planetary pinion 34 is rotatably supported on a pinion shaft 69, while the planetary pinion 37 is rotatably supported on a pinion shaft 68 mounted on a carrier 36. An output shaft 39 of the underdrive gear mechanism 3 is coupled to the ring gear 38 and carrier 33. Provided between a carrier 36 and transmission case 18 are a multiple disc brake 27 and a one-way clutch 28.

A lower side of the underdrive gear mechanism is covered with an oil pan 75a. The oil pan 75a accommodates therein a hydraulic control device 4a adapted to control a hydraulic pressure to be delivered to a hydraulic servo (cylinder) for the underdrive gear mechanism. A passage 76 formed under the front end of transmission case 18 connects the oil passage 73 provided in the oil pump cover 21 to the interior of oil pan 75a.

In addition to the oil passage 73, the oil pump cover 21 is provided with an oil passage connecting the hydraulic control device 4a to the clutch cylinder 65, and another oil passage connecting a discharge port of the oil pump 71 to the hydraulic control device 4a. In addition, an oil passage for delivering oil from the hydraulic control device 4a to the torque converter 1, and an oil passage for returning oil from the torque converter 1 to the hydraulic control device 4a are formed in the oil pump body 20 and oil pump cover 21.

A level H1 shown in FIG. 1 represents the height or level of oil during normal cruising of the motor vehicle.

Figure 2:
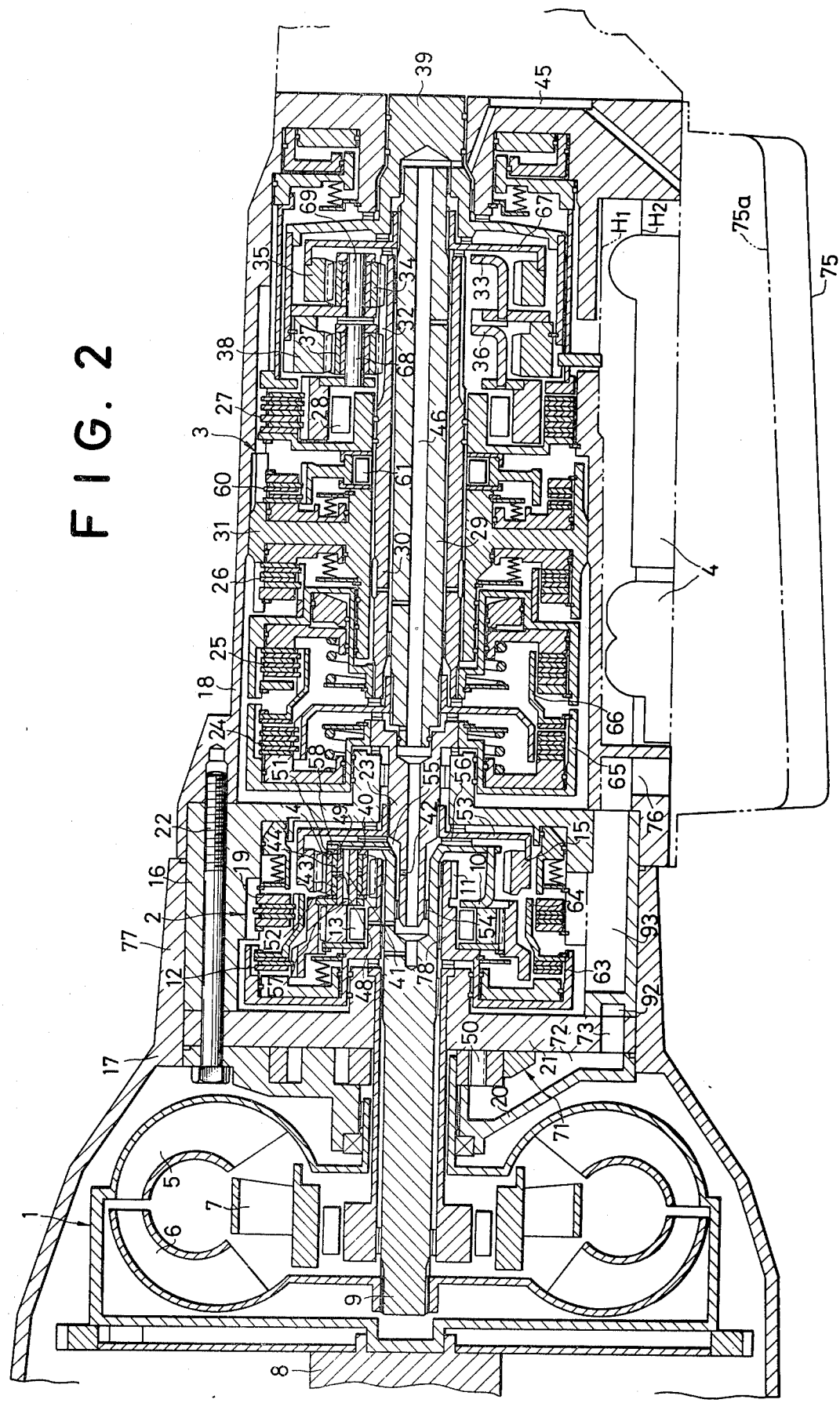
FIG. 2 and 3 are longitudinal cross-sectional views of automatic transmissions embodying the present invention.

FIG. 2 is a longitudinal cross-section view of an automatic transmission having an overdrive gear mechanism 2 according to the present invention. Like parts are designated like reference numerals common with those given in FIG. 1.

The turbine shaft 9 serves as an output shaft for the torque converter 1, as well as an input shaft for the overdrive gear mechanism, being coupled to the carrier 10 for a planetary gear unit in the overdrive gear mechanism. The carrier 10 is formed with a pinion shaft 49, while needle bearing 43, 44 are fitted on the pinion shaft 49 in two rows. The planetary pinion 14 is rotatably supported by the pinion shaft 49 through the medium of needle bearings 43, 44, and meshes with the sun gear 11 and ring gear 15. Thrust washers 51, 52 are provided between the planetary pinion 14 and the carrier 10 on opposite sides, respectively. The sun gear shaft 78 carrying the sun gear 11 thereon is coupled to a clutch cylinder 63. A hub 64 is splined to the clutch cylinder 63. A multiple disc clutch 12 is positioned between the clutch cylinder 63 and the carrier 10, while a one-way clutch 13 is provided between the sun gear shaft 78 and the carrier 10. A mulitple disc brake 19 is provided between the hub 64 and the overdrive case 16 accommodating the overdrive gear mechanism therein. The housing 17 encloses the torque converter 1, and is formed with an extension portion 77 having a cylindrical inner surface. The overdrive case 16 has an cylindrical wall fitted in the inner cylindrical surface of the extension portion 77. A flange 53 is coupled to the ring gear 15 and splined to an input shaft 23 of the underdrive gear mechanism 3. The input shaft 23 is positioned in coaxial relation to the turbine shaft 9 and coupled to the clutch cylinder 65 in the underdrive gear mechanism 3. A bearing 54 is interposed between the turbine shaft 9 and the input shaft 23, while a washer 56 is positioned between the carrier 10 and the flange 53. The oil pump body 20, oil pump cover 21, overdrive case 16 and transmission case 18 are fastened together by means of two or more bolts 22.

The relationship between change-gear positions and operations of respective clutches and brakes in the automatic transmission thus arranged is shown in the following Table 1.

TABLE 1

| shift position | | 12 | 24 | 25 | 19 | 26 | 27 | 13 | 28 | 61 | 60 |
|---|---|---|---|---|---|---|---|---|---|---|---|
| P | | O | X | X | X | X | O | / | / | / | X |
| R | | O | X | O | X | X | O | RC | RC | OR | X |
| N | | O | X | X | X | X | N | / | / | / | X |
| D | 1st speed drive | O | O | X | X | X | X | RC | RC | RC* | X |
| | 2nd speed drive | O | O | X | X | O | X | RC | OR | RC | O |
| | 3rd speed drive | O | O | O | X | X | X | RC | OR | OR | O |
| | OD | X | O | O | O | X | X | OR | OR | OR | O |
| 2 | 1st speed drive | O | O | X | X | X | X | RC | RC | RC | X |
| | 2nd speed drive | O | O | X | X | O | X | RC | OR | RC | O |
| L | | O | O | X | X | X | O | RC | RC | OR | X |

In table 1, the reference characters and symbols shown designate the following:
P: parking range
R: reverse range
N: neutral range D: drive range
2: second range
L: low range
O: engaged condition
X: released condition
RC: locked condition
OR: overrun condition
\* torque is not transmitted In the lubrication and cooling of respective components constituting the overdrive gear mechanism 2 and underdrive gear mechanism 3, oil which has been pressurized by the oil pump 71 is adjusted to a given pressure level by the hydraulic control device 4. The oil thus adjusted is delivered via oil passage 45 in the transmission case 18 and an oil passage in the intermediate shaft 29 to respective components of the overdrive gear mechanism 2 and underdrive gear mechanism 3 for lubrication and cooling. Specific oil passage means is provided in the overdrive gear mechanism 2 for lubricating and cooling the neighborhood of the needle bearings 43, 44. Thus, an oil chamber 55 is defined by and between the input shaft 23 and turbine shaft 9. The oil chamber 55 is communicated with an inner bore provided in the input shaft 23 via a hole 42 provided in the wall of the input shaft 23. Oil passage 40 runs in the radial direction of the carrier 10 and communicates with the oil chamber 55 at one end thereof, and is blocked with a plug 58 at the other. An oil passage 40 runs through the pinion shaft 49 in the axial direction. The oil passage 41 is connected to the oil passage 40 at one end thereof and is blocked with a plug 57 at the other. Midway of the pinion shaft 49 as viewed in the axial direction, there is provided an oil passage 48 which is connected to the oil passage 41 at one end and terminates between the needle bearings 43, 44. Respective elements in the neighborhood of the needle bearings 43, 44 are lubricated and cooled with oil of a given pressure, which is supplied through hole 42, oil chamber 55 and oil passages 40, 41, 48.

Oil which has lubricated and cooled respective components in the overdrive gear mechanism 2 is then returned via return passage 93 to an oil pan 75. To this end, the level of oil under the underdrive gear mechanism is lowered from H1 to H2. The level H2 is so set as to be lower than the position of return passage 93. The oil pan 75 having a deeper depth than that of the oil pan 75a is used for accommodating oil of an optimum amount, with the oil level being maintained lowered to the level H2. Alternatively, this may be attained by simply lowering an attaching position of the oil pan 75a to the transmission case 18, without modifying the oil pan 75a.

Figure 3:
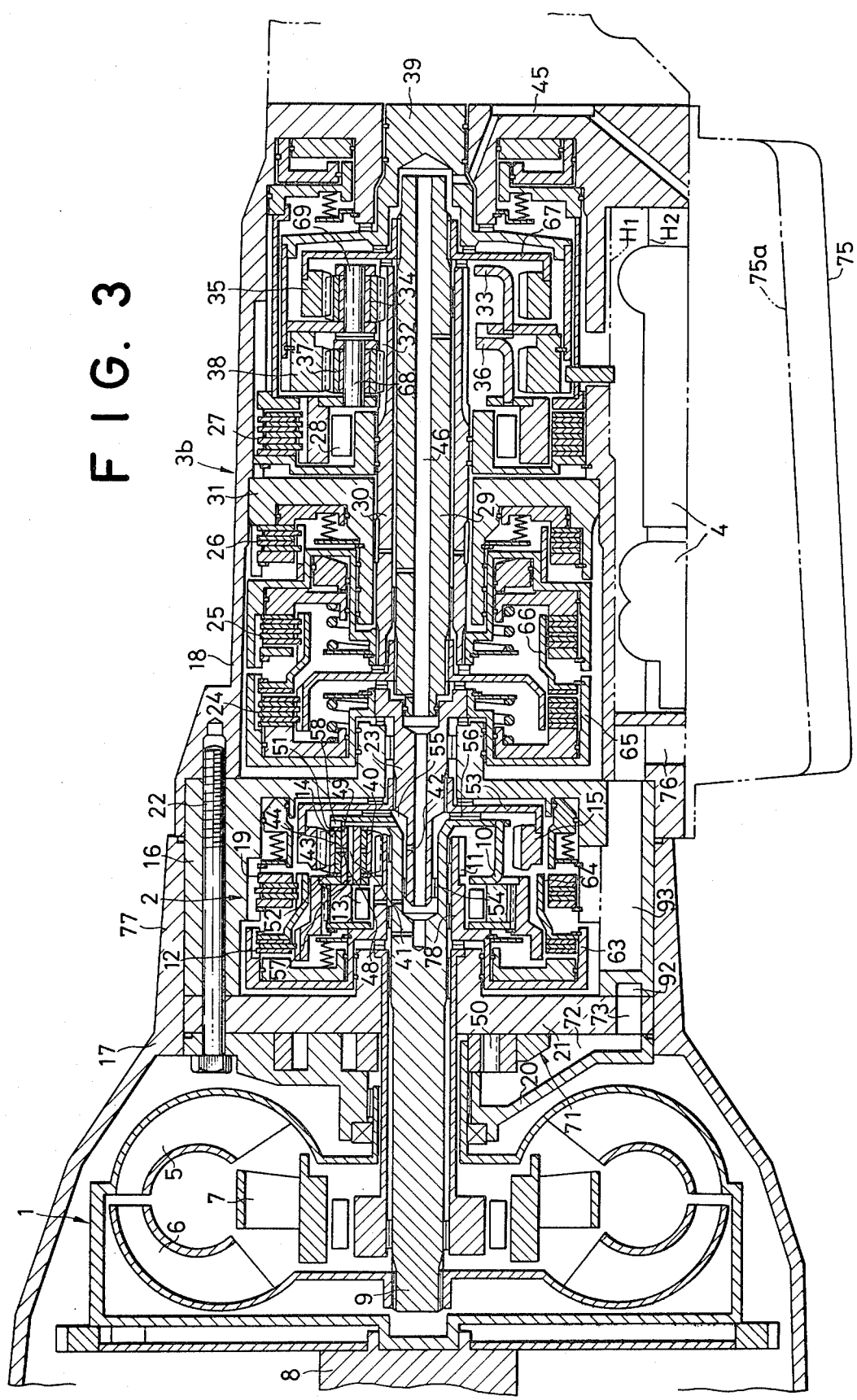

FIG. 3 shows another embodiment of the automatic transmission according to the present invention. In this case, like parts are designated like reference numerals in common with those given in FIG. 2. A difference between the embodiments shown in FIGS. 2 and 3 is that in the embodiment of FIG. 3, the multiple disc brake 60 and one-way clutch 61 are omitted from the underdrive gear mechanism 3b, while the other points remain unchanged. With the underdrive gear mechanism 3 of FIG. 2, a series connection of the multiple disc brake 60 and one-way clutch 61 is provided between the center support 31 and the sun gear shaft 30. The underdrive gear mechanism 3 having the aforesaid series connection is more advantageous than the underdrive gear mechanism 3b in the shift timing between 2-speed and 3-speed drives.

The relationship between change gear positions and operating conditions of respective clutches and brakes, may be tabulated in a similar manner to that of Table 1. In other words, the columns for multiple disc brake 60 and one-way clutch 61 are simply eliminated for this purpose. The relationship of components of overdrive and underdrive gear mechanisms 3, 3b is summarized in Table 2 as follows:

TABLE 2

| overdrive gear mechanism 2 | underdrive gear mechanism 3,3b | relationship |
|---|---|---|
| ring gear 15 | ring gear 38 or 35 | common, configuration partially changed, or only dimensions of gear are used in common |
| pinion gear 14 | pinion gear 37 or 34 | common, configuration partially changed, or only dimensions of gear are used in common |
| sun gear 11 | sun gear 32 | dimensions of gear are used in common |
| flange 53 | flange 67 | common |
| pinion shaft 49 | piniomn shaft 68 or 69 | common or partial additional machining |
| washer for planetary pinion 14 in axial direction | washers for planetary pinion 34 or 37 axial direction | common |
| clutch cylinder 63 | clutch cyclinder 65 | configuration partically changed |
| multiple disc clutch 12 and multiple brake 19 | multiple disc clutches 24,25 or multiple disc brakes 26,60,67 | common |
| hub 64 | hub 66 | configuration partically changed |
| one-way clutch 13 | one-way clutch 61 | common |
| one-way clutch 13 | one-way clutch 28 | common |

As shown in the drawings, an oil pump body 20, oil pump gear 50 and oil cover 21 may be utilized in common in an automatic transmission having no overdrive gear mechanism, such as shown in FIG. 1, and in an automatic transmission having an overdrive gear mechanism either intact or in a partially modified form.

According to the present invention, an automatic transmission with overdrive may be readily modified from the conventional automatic transmission devoid of overdrive, with an output side of the overdrive gear mechanism 2 being splined to the input side of the underdrive gear mechanism 3.

In addition, substantially common components are used for the overdrive gear mechanism 2 and the underdrive gear mechanism 3 or 3b presenting the following advantages.

(1) Reduction in manufacturing cost of an automatic transmission, because of the use of common parts.
(2) The standardization of dimensions of gears with the accompanying reduction in machining tools and equipment.
(3) Standardization of clutch cylinder and hub with the resulting reduction in press dies and press machines.
(4) Improvements in assembling operations due to the use of common parts.
(5) Improvements in durability and reliability due to the use of common parts.

(6) Standardization of dimensions of planetary pinions which are used in common, with the resulting achievement of optimum overdrive gear ratios and reduction in fuel consumption as well as improvement in drivability.

(7) Reduction in size of the transmission due to the use of common parts.

While specific embodiments of the invention have been shown and described in detail to illustrate the application of the inventive principles, it will be understood that the invention may be embodied otherwise without departing from such principles.

What is claimed is:

1. In an automatic transmission with overdrive for use in automotive vehicles particularly adapted to have parts thereof interchangeably utilized in other transmissions not including overdrive, the combination comprising: a torque converter consisting of a pump impeller, stator vanes, and turbine vanes, and including a turbine shaft for said turbine vanes having an output end; an overdrive gear mechanism having an overdrive input shaft, and a planetary gear unit controlled by a first frictional engaging means coupled to said overdrive input shaft, said overdrive gear mechanism providing a gear reduction ratio of not more than 1; an underdrive gear mechanism having an underdrive input shaft, and a plurality of planetary gear units which are coupled through the medium of a second frictional engaging means to said underdrive input shaft and controlled by said second frictional engaging means and a plurality of other frictional engaging means, said underdrive gear mechanism providing gear reduction rates of not less than 1; said underdrive gear mechanism being structured to be coupled in direct driving engagement with said torque converter in the absence of said overdrive gear mechanism; said torque converter, said overdrive gear mechanism and said underdrive gear mechanism being separably segmented and fastened together by simple fastening means; a torque converter housing, an overdrive case, and a transmission case separately provided for said torque converter, said overdrive gear mechanism and said underdrive gear mechanism, respectively; said overdrive gear mechanism being positioned between said torque converter and said underdrive gear mechanism, with said overdrive input shaft and said output end of said turbine shaft being joined together by a splined connection; said overdrive input shaft and said underdrive input shaft being positioned in axial alignment with each other; a cylindrical extension formed on said torque converter housing with a given inner diameter; said overdrive case being of a cylindrical form and having an outer diameter which is substantially equal to said given inner diameter of said torque converter housing extension; said transmission case also having a cylindrical extension with an inner diameter substantially equal to both said given inner diameter of said torque converter housing extension and said outer diameter of said overdrive case; said overdrive case being fitted in said cylindrical extension of said torque converter housing and in said cylindrical extension of said transmission case, with said torque converter housing, said overdrive case and said transmission case being fastened together by a plurality of bolts extending therethrough; said torque converter and said underdrive gear mechanism being each structured, respectively, of a standardized configuration enabling each to be selected from a plurality of other identical units produced by mass production techniques whereby parts useful in said automatic transmission may also be used in other automatic transmissions not including an overdrive gear mechanism.

* * * * *